United States Patent
Keelan et al.

(10) Patent No.: US 10,136,107 B2
(45) Date of Patent: Nov. 20, 2018

(54) IMAGING SYSTEMS WITH VISIBLE LIGHT SENSITIVE PIXELS AND INFRARED LIGHT SENSITIVE PIXELS

(71) Applicant: Semiconductor Components Industries, LLC, Phoenix, AZ (US)

(72) Inventors: Brian Keelan, Boulder Creek, CA (US); Marko Mlinar, Horjul (SL)

(73) Assignee: Semiconductor Components Industries, LLC, Phoenix, AZ (US)

( * ) Notice: Subject to any disclaimer, the term of this patent is extended or adjusted under 35 U.S.C. 154(b) by 293 days.

(21) Appl. No.: 14/086,705

(22) Filed: Nov. 21, 2013

(65) Prior Publication Data
US 2015/0138366 A1  May 21, 2015

(51) Int. Cl.
*H04N 5/225* (2006.01)
*H04N 5/33* (2006.01)
*H04N 9/04* (2006.01)
*H04N 9/64* (2006.01)

(52) U.S. Cl.
CPC ............. *H04N 9/045* (2013.01); *H04N 5/332* (2013.01); *H04N 9/64* (2013.01)

(58) Field of Classification Search
CPC .............................. H04N 5/2258; H04N 5/33
USPC ......................................................... 348/164
See application file for complete search history.

(56) References Cited

U.S. PATENT DOCUMENTS

| 6,211,521 | B1 | 4/2001 | Bawolek et al. |
| 6,330,029 | B1 | 12/2001 | Hamilton et al. |
| 7,688,368 | B2 | 3/2010 | Kijima et al. |
| 8,408,821 | B2 | 4/2013 | Wu et al. |
| 8,446,470 | B2* | 5/2013 | Lu ........................ H04N 5/2258 348/148 |
| 8,462,238 | B2* | 6/2013 | Fredembach ..... H01L 27/14621 348/273 |
| 2003/0112353 | A1* | 6/2003 | Morris ................... H04N 5/332 348/310 |
| 2007/0183657 | A1* | 8/2007 | Kidono ................ G06K 9/2018 382/162 |

(Continued)

OTHER PUBLICATIONS

Mlinar et al., U.S. Appl. No. 13/736,768, filed Jan. 8, 2013.
Mackey et al., U.S. Appl. No. 13/951,211, filed Jul. 25, 2013.

*Primary Examiner* — Deirdre L Beasley
(74) *Attorney, Agent, or Firm* — Treyz Law Group, PC.; Michael H. Lyons; David K. Cole (57) ABSTRACT

An image sensor may have an array of image pixels arranged in color filter unit cells that each have at least one red image pixel that generates red image signals, at least one blue image pixel that generate blue image signals, at least one clear image pixels that generate clear image signals, at least one infrared image pixel that generates infrared image signals, and optionally at least one green image pixel that generates green image signals. The image sensor may be coupled to processing circuitry that performs chroma demosaicking operations on the image signals. The processing circuitry may generate an infrared image using the infrared image signals and a luminance value using the clear, red, blue, and infrared image signals. The processing circuitry may perform point filter operations on the image signals based on the generated luminance value to produce corrected visible light image signals having improved image quality.

19 Claims, 6 Drawing Sheets

(56) References Cited

U.S. PATENT DOCUMENTS

| | | | |
|---|---|---|---|
| 2007/0273781 A1* | 11/2007 | Choe | H01L 27/14621 348/311 |
| 2007/0285540 A1* | 12/2007 | Kwon | H04N 5/332 348/272 |
| 2008/0030603 A1* | 2/2008 | Masuno | H04N 9/045 348/273 |
| 2008/0087800 A1* | 4/2008 | Toda | H01L 27/14603 250/214 C |
| 2008/0218597 A1* | 9/2008 | Cho | H04N 5/2351 348/222.1 |
| 2008/0283729 A1* | 11/2008 | Hosaka | H04N 5/332 250/208.1 |
| 2009/0009621 A1* | 1/2009 | Yamaguchi | H04N 5/33 348/222.1 |
| 2009/0159799 A1* | 6/2009 | Copeland | G01J 3/36 250/338.1 |
| 2010/0141771 A1* | 6/2010 | Hu | H01L 27/14621 348/164 |
| 2010/0283866 A1* | 11/2010 | Numata | H04N 5/332 348/223.1 |
| 2010/0302423 A1 | 12/2010 | Adams, Jr. et al. | |
| 2011/0228097 A1 | 9/2011 | Motta | |
| 2011/0235017 A1* | 9/2011 | Iwasaki | H04N 5/2354 356/4.01 |
| 2011/0243430 A1* | 10/2011 | Hung | H04N 1/486 382/162 |
| 2011/0317048 A1* | 12/2011 | Bai | H01L 27/1461 348/294 |
| 2012/0154596 A1* | 6/2012 | Wajs | H04N 5/33 348/164 |
| 2012/0189293 A1* | 7/2012 | Cao | G03B 9/02 396/333 |
| 2012/0218410 A1* | 8/2012 | Kim | G02B 5/201 348/148 |
| 2012/0281081 A1* | 11/2012 | Atif | G02B 27/0075 348/79 |
| 2013/0208117 A1* | 8/2013 | Kamon | H04N 9/045 348/148 |
| 2013/0278726 A1* | 10/2013 | Muhammad | H04N 9/045 348/46 |
| 2013/0329053 A1* | 12/2013 | Jones | H04N 9/735 348/164 |
| 2014/0015932 A1* | 1/2014 | Kim | H04N 13/0257 348/46 |
| 2014/0055565 A1* | 2/2014 | You | H04N 13/0207 348/46 |
| 2014/0125838 A1* | 5/2014 | Mackey | H04N 9/045 348/224.1 |
| 2014/0183337 A1* | 7/2014 | Hu | H01L 27/14621 250/208.1 |
| 2014/0231621 A1* | 8/2014 | Tsau | H01L 27/14621 250/208.1 |

* cited by examiner

IMAGING SYSTEMS WITH VISIBLE LIGHT SENSITIVE PIXELS AND INFRARED LIGHT SENSITIVE PIXELS

BACKGROUND

This relates generally to imaging devices, and more particularly, to imaging devices with broadband image pixels and infrared image pixels.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels.

Conventional imaging systems employ a single image sensor in which the visible light spectrum is sampled by red, green, and blue (RGB) image pixels arranged in a Bayer mosaic pattern. The Bayer Mosaic pattern consists of a repeating cell of two-by-two image pixels, with two green pixels diagonally opposite one another, and the other corners being red and blue. However, the Bayer pattern does not readily enable further miniaturization of image sensors via smaller image pixel sizes because of limitations of signal to noise ratio (SNR) in the image signals captured from the image pixels.

In some cases, imaging systems may be provided with infrared imaging capabilities for generating infrared images of a scene. In conventional imaging systems with infrared imaging capabilities, one of the green image pixels in the Bayer Mosaic pattern is replaced with an infrared image pixel. However, forming a Bayer Mosaic pattern having an infrared image sensitive pixel can limit the resolving power and reduce the luminance response and SNR of the image sensor when capturing visible light images.

It would therefore be desirable to be able to provide imaging devices with improved means of capturing and processing image signals.

BRIEF DESCRIPTION OF THE DRAWINGS

FIGS. 3-7 are diagrams of illustrative pixel unit cells of different sizes having broadband filter image pixels and infrared-sensitive image pixels for generating visible light images and infrared images in accordance with embodiments of the present invention.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements. Readout circuitry may include selectable readout circuitry coupled to each column of pixels that can be enabled or disabled to reduce power consumption in the device and improve pixel readout operations.

Figure 1:
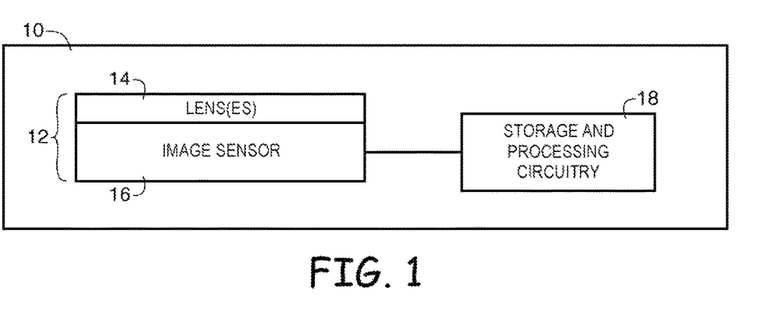
FIG. 1 is a diagram of an illustrative electronic device having an imaging system in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a tablet computer, a webcam, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
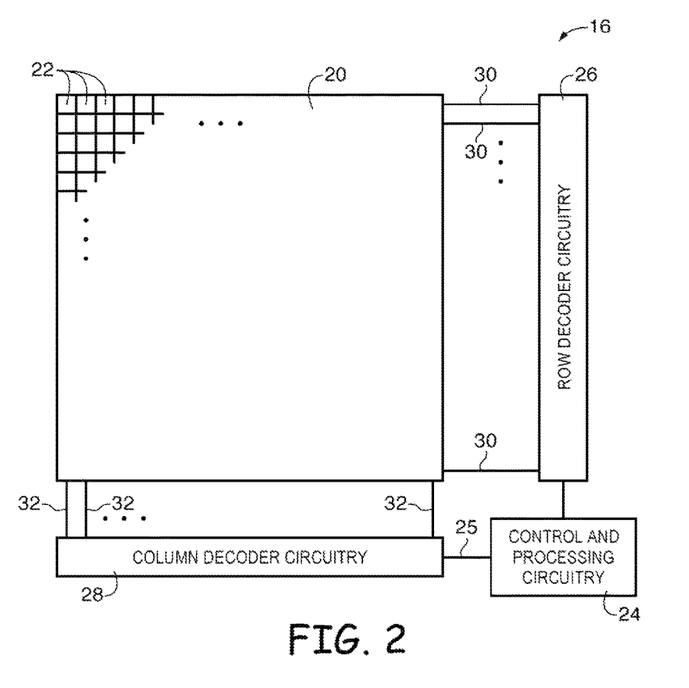
FIG. 2 is a diagram of an illustrative pixel array and associated control circuitry for reading out pixel data from image pixels along column lines in an image sensor in accordance with an embodiment of the present invention.

As shown in FIG. 2, image sensor 16 may include a pixel array 20 containing image sensor pixels 22 (sometimes referred to herein as image pixels 22) and control and processing circuitry 24. Array 20 may contain, for example, hundreds or thousands of rows and columns of image sensor pixels 22. Control circuitry 24 may be coupled to row decoder circuitry 26 and column decoder circuitry 28. Row decoder circuitry 26 may receive row addresses from control circuitry 24 and supply corresponding row control signals such as reset, row-select, transfer, and read control signals to pixels 22 over control paths 32. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. During pixel readout operations, a pixel row in array 20 may be selected using row decoder circuitry 26 and image data associated with image pixels 22 in that pixel row can be read out along column lines 32.

Column decoder circuitry 28 may include sample-and-hold circuitry, amplifier circuitry, analog-to-digital conversion circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. Column decoder circuitry 28 may be used to selectively provide power to column circuitry on a selected subset of column lines 32. Readout circuitry such as signal processing circuitry associated with column decoder circuitry 28 (e.g., sample-and-hold circuitry and analog-to-digital conversion circuitry) may be used to supply digital image data to control and processing circuitry 24 and/or processor 18 (FIG. 1) over path 25 for pixels in chosen pixel columns.

Image sensor pixels such as image pixels 22 are conventionally provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. However, limitations of signal to noise ratio (SNR) that are associated with the Bayer Mosaic pattern make it difficult to reduce the size of image sensors such as image sensor 16. It may therefore be desirable to be able to provide image sensors with an improved means of capturing images.

Figure 3:
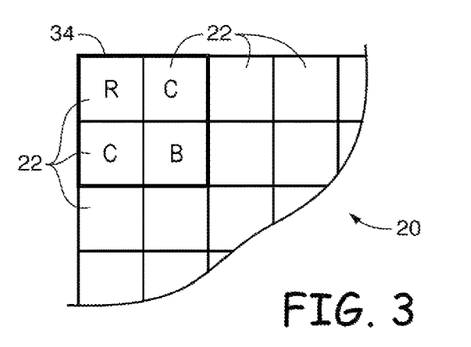
FIG. 3 is a diagram of an illustrative pixel unit cell having broadband filter image pixels in accordance with an embodiment of the present invention.

In one suitable arrangement that is sometimes discussed herein as an example, the green pixels in a Bayer pattern are replaced by broadband image pixels as shown in FIG. 3. As shown in FIG. 3, a unit cell 34 of image pixels 22 may be formed from two clear (C) image pixels (sometimes referred to as white image pixels or clear filter image pixels) that are diagonally opposite one another and adjacent to a red (R) image pixel that is diagonally opposite to a blue (B) image pixel. Clear image pixels 22 in unit cell 34 may be formed with a visibly transparent color filter that transmits light across the visible light spectrum (e.g., clear pixels 22 can capture white light). Clear image pixels 22 may have a natural sensitivity defined by the material that forms the transparent color filter and/or the material that forms the image sensor pixel (e.g., silicon). In another suitable arrangement, clear image pixels 22 may be formed without any color filter elements. The sensitivity of clear image pixels 22 may, if desired, be adjusted for better color reproduction and/or noise characteristics through use of light absorbers such as pigments. Clear image pixels 22 may be sensitive to light across the entire visible light spectrum or may be sensitive to broad portions of the visible light spectrum. Unit cell 34 may be repeated across image pixel array 20 to form a mosaic of red, clear, and blue image pixels 22. In this way, red image pixels may generate red image signals in response to red light, blue image pixels may generate blue image signals in response to blue light, and clear image pixels may generate clear image signals in response to white light (e.g., any desired broad-spectrum visible light). Clear image pixels 22 may have a substantial response to any suitable combination of light of at least two of the following colors: red, green, and blue. In this way, clear image pixels 22 may have a broadband response relative to the non-clear image pixels in each unit cell (e.g., clear pixels 22 may therefore sometimes be referred to as broadband image pixels 22). If desired, broadband pixels 22 may have clear color filter elements in which a pigment such as a yellow pigment has been added to clear color filter element material (e.g., so that the color filter of broadband pixels 22 pass red and green light). The example of FIG. 3 is merely illustrative. If desired, unit cell 34 may have any desired size, may be rectangular, and may include any desired colored pixels.

Image pixels 22 in pixel array 20 may have a native sensitivity that extends into the infrared (IR) region of the electromagnetic spectrum (e.g., image pixels 22 may have a sensitivity to light that has a wavelength of greater than 700 nm). In visible imaging applications, this unwanted infrared sensitivity may be suppressed by forming an infrared cutoff filter in camera module 12. For example, an infrared cutoff filter may be interposed between lens 14 and image sensor 16 (FIG. 1), may be formed as a coating on one or more surfaces of lenses 14, etc. In one suitable arrangement, an infrared notch filter may be interposed between lens 14 and image sensor 16 across each image pixel 22 in array 20. In another suitable arrangement, an infrared cutoff filter may be coated only over the pixels in array 20 that are sensitive to visible light.

In some scenarios, device 10 may include separate arrays of visible light sensitive image pixels (e.g., red image pixels, green image pixels, blue image pixels, etc.) and infrared light sensitive image pixels. However, forming a separate infrared pixel array on device 10 may occupy an excessive amount of space within device 10. If desired, device 10 may include one or more infrared light sensitive image pixels 22 (sometimes referred to herein as infrared-sensitive pixels, infrared pixels, or infrared image pixels 22) for capturing infrared images. Device 10 having infrared pixels 22 may, for example, be formed as a part of a surveillance imaging system, gaming imaging system, automotive imaging system, or any other desired imaging systems. If desired, device 10 may include an infrared light emitter that illuminates a scene using infrared light centered about a selected infrared wavelength.

Pixel array 20 having infrared pixels 22 may be used to perform both visible light and infrared light imaging operations. Pixel array 20 having infrared pixels 22 may generate infrared light images in response to infrared light and may generate visible light images in response to visible light. Infrared sensitive image pixels 22 in pixel array 20 may be sensitive to infrared light (e.g., light having a wavelength of greater than or equal to 700 nm). Infrared sensitive image pixels 22 may be insensitive to visible light (e.g., light having a wavelength of between 400 and 700 nm). For example, infrared pixels 22 may include a visible light cutoff filter that blocks visible light from being captured by the infrared pixels.

If desired, each unit cell of image pixels 22 in array 20 may include one or more infrared image pixels 22 (e.g., one of the image pixels in unit cell 34 of FIG. 3 may be replaced by an infrared image pixel). Repeating unit cells in array 20 having infrared image pixels may each include any desired number of image pixels 22. For example, array 20 may include two-pixel by four-pixel unit cells, two-pixel by two-pixel unit cells, four-pixel by four-pixel unit cells, or unit cells of any other desired size that each include broadband pixels and infrared image pixels.

Figure 4:
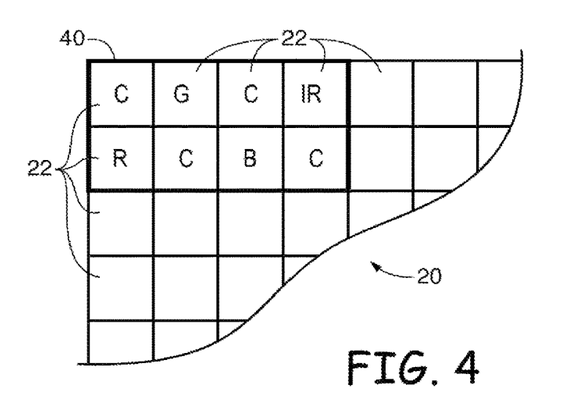

FIG. 4 shows a diagram of an illustrative unit cell in array 20 that includes an infrared image pixel 22. In the example of FIG. 4, array 20 includes a repeating unit cell 40 of image pixels 22. Unit cell 40 may be a two-pixel by four-pixel unit cell of eight image pixels 22. As shown in FIG. 4, unit cell 40 may include four broadband image pixels (C), one red image pixel (R), one green image pixel (G), one blue image pixel (B), and one infrared image pixel (IR) Infrared image pixel 22 may include, for example, a black color filter element that blocks visible light while transmitting infrared light.

The broadband image pixels (C) in unit cell 40 may be formed diagonally adjacent to one another in a zig-zag (checker-board) pattern. The first row of unit cell 40 may include a first broadband image pixel formed adjacent to the green image pixel. A second broadband image pixel may be interposed between the green image pixel and the infrared image pixel. The second row of unit cell 40 may include the red image pixel formed adjacent to a third broadband image pixel. The blue image pixel may be interposed between the third broadband image pixel and a fourth broadband image pixel. Unit cell 40 may be repeated throughout array 20 in a repeating pattern. Array 20 having repeating unit cell 40 may thereby include broadband image pixels in each row and each column of the pixel array. Array 20 may include infrared image pixels 22 in every four columns. Half of the image pixels in array 20 having unit cell 40 may be broadband image pixels, allowing for improved light capture abilities relative to conventional Bayer filter image sensors. Array 20 having unit cells 40 may thereby gather image signals having improved SNR, improved luminance channel image fidelity, and improved resolving power relative to Bayer filter image sensors.

The example of FIG. 4 is merely illustrative. If desired, the image pixels 22 within unit cell 40 may be arranged in any order. For example, the positions of the red, green, blue, and infrared pixels 22 in unit cell 40 may be permuted (e.g., the location of the red image pixel in unit cell 40 may be swapped with the location of the green image pixel, the blue image pixel, or the infrared image pixel, the location of the green image pixel in unit cell 40 may be swapped with the location of the red image pixel, blue image pixel, or infrared image pixel, the location of the infrared image pixel in unit cell 40 may be swapped with the location of the red image pixel, blue image pixel, or green image pixel, etc.).

Figure 5:
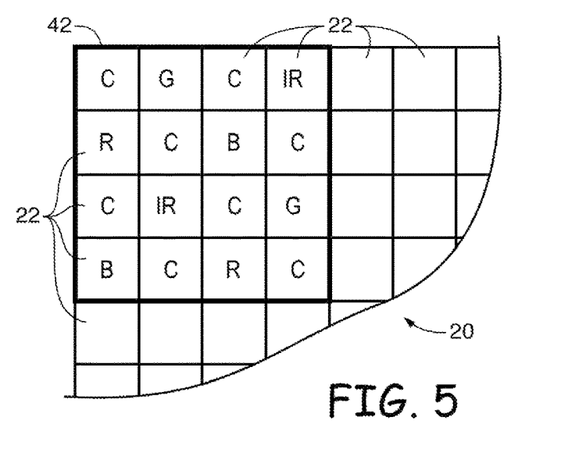

FIG. 5 shows a diagram of another illustrative unit cell having infrared and clear image pixels 22 that may be formed on array 20. In the example of FIG. 5, pixel array 20 includes a four-pixel by four-pixel unit cell 42 of image pixels 22. As shown in FIG. 5, unit cell 42 may include eight broadband image pixels (C), two red image pixels (R), two blue image pixels (B), two infrared image pixels (IR), and two green image pixels (G). The broadband image pixels (C) in unit cell 42 may be formed diagonally adjacent to one another in a checker-board pattern. The first row of unit cell 42 may include a first broadband image pixel formed adjacent to a first green image pixel. A second broadband image pixel may be interposed between the first green image pixel and a first infrared image pixel. The second row of unit cell 42 may include a first red image pixel formed adjacent to a third broadband image pixel. A first blue image pixel may be interposed between the third broadband image pixel and a fourth broadband image pixel. The third row of unit cell 42 may include a fifth broadband image pixel formed adjacent to a second infrared image pixel. A sixth broadband image pixel may be interposed between the second infrared image pixel and a second green image pixel. The fourth row of unit cell 42 may include a seventh broadband image pixel interposed between a second blue image pixel and a second red image pixel. The second red image pixel may be interposed between the seventh broadband image pixel and an eighth broadband image pixel.

Unit cell 42 may be repeated throughout array 20 in a repeating pattern. In this way, pixel array 20 may include broadband image pixels in each row and column of the pixel array and may include infrared image pixels in every two columns of the pixel array. The red, green, and blue image pixels in pixel array 20 having unit cell 40 may be located in every two columns of pixel array 20. Half of the image pixels 22 in array 20 having unit cell 42 may be broadband image pixels, allowing for improved light capture abilities relative to conventional Bayer filter image sensors. Array 20 having unit cells 42 may thereby gather image signals having improved SNR, improved luminance channel image fidelity, and improved resolving power relative to Bayer filter image sensors. Pixel array 20 having unit cells 42 may have improved chromatic resolving power and alignment relative to pixel arrays having unit cell 40 of FIG. 4 because red, blue, green, and infrared image pixels 22 are located in every two columns of pixel arrays having unit cell 42, whereas the red, blue, green, and infrared image pixels 22 are located in every four columns of pixel arrays having unit cell 40. However, pixel arrays 20 having unit cell 42 may require a more image processing resources than pixel arrays 20 having unit cell 40 of FIG. 4 (e.g., image sensors having unit cell 40 may perform image processing operations faster than image sensors having unit cell 42).

The example of FIG. 5 is merely illustrative. If desired, image pixels 22 within unit cell 42 may be arranged in any order. For example, the positions of the red, green, blue, and infrared pixels 22 in unit cell 42 may be permuted (e.g., the location of the red image pixels in unit cell 42 may be swapped with the location of the green image pixels, the location of one of the red image pixels in unit cell 42 may be swapped with the location of one of the blue image pixels, etc.).

Figure 6:
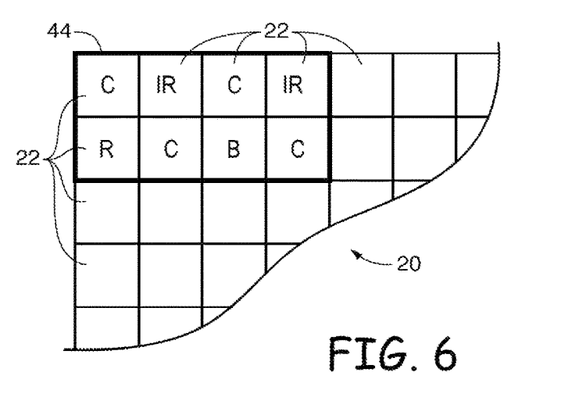

FIG. 6 shows a diagram of another illustrative unit cell having infrared and broadband image pixels 22 that may be formed on pixel array 20. In the example of FIG. 6, pixel array 20 includes a two-pixel by four-pixel unit cell 44 of image pixels 22. As shown in FIG. 6, unit cell 44 may include four broadband image pixels (C), one red image pixel (R), one blue image pixel (B), and two infrared image pixels (IR). Image pixels 22 in unit cell 44 may be arranged similar to unit cell 40 of FIG. 4 but with the green image pixel of unit cell 40 replaced with a second infrared image pixel. In other words, the broadband image pixels 22 in unit cell 42 may be formed diagonally adjacent to one another in a zig-zag (checker-board) pattern. The first row of unit cell 44 may include a first broadband image pixel formed adjacent to a first infrared image pixel. A second broadband image pixel may be interposed between the first infrared image pixel and a second infrared image pixel. The second row of unit cell 40 may include the red image pixel formed adjacent to a third broadband image pixel. The blue image pixel may be interposed between the third broadband image pixel and a fourth broadband image pixel.

Unit cell 44 may be repeated throughout array 20 in a repeating pattern. In this way, pixel array 20 may include broadband image pixels in each row and column of the pixel array and may include infrared image pixels in every second column (e.g., half of the image pixels 22 in array 20 may be broadband image pixels). Pixel array 20 having unit cells 44 may have improved infrared resolving power and aliasing relative to pixel arrays having unit cell 40 of FIG. 4 because the number density of infrared image pixels in unit cell 44 is greater than the number density of infrared image pixels in unit cell 40 (e.g., because infrared image pixels 22 are located in every two columns of arrays having unit cell 44 whereas infrared image pixels 22 are located in every four columns of arrays having unit cell 40). Image sensor 16 having unit cell 44 may compute a green image signal by performing a weighted subtraction of red image signals and blue image signals from the broadband image signals generated by array 20. Performing the weighted subtraction to generate the green image signals may amplify noise generated by arrays having unit cell 44 relative to arrays having unit cell 40 of FIG. 4.

The example of FIG. 6 is merely illustrative. If desired, image pixels 22 within unit cell 44 may be arranged in any order. For example, the positions of the red, blue, and infrared pixels 22 in unit cell 44 may be permuted (e.g., the location of the red image pixels in unit cell 44 may be swapped with the location of the blue image pixel, etc.) Arrays formed with unit cell 44 may exhibit improved imaging performance when formed with an infrared cut-off filter that is individually coated over visible light sensitive image pixels 22 (e.g., without being coated over infrared image pixels 22) relative to scenarios when an infrared notch filter is provided for all image pixels 22 across array 20. In scenarios where an infrared cut-off filter is individually coated over visible light sensitive image pixels 22, unit cell 44 may provide improved color reproduction for image sensor 16 relative to unit cells 40 and 42. However, when the visible light image pixels are individually covered with infrared cutoff filters, the image pixels may not be used as infrared-sensitive pixels when infrared light dominates an imaged scene, such as indoor scenes with active infrared illumination (e.g., for video gaming applications). Thus, the higher number density of infrared pixels as shown in FIG. 6 can be advantageous in scenarios where pixel-wise infrared cutoff filters are formed.

Figure 7:
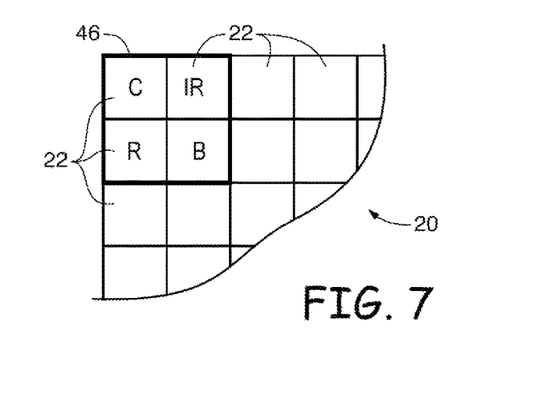

FIG. 7 shows a diagram of another illustrative unit cell having infrared and broadband image pixels 22 that may be formed on pixel array 20. In the example of FIG. 7, pixel array 20 includes a two-pixel by two-pixel unit cell 46 of image pixels 22. As shown in FIG. 7, unit cell 46 may include one broadband image pixel (C), one infrared image pixel (IR), one red image pixel (R), and one blue image pixel (B). The broadband image pixel may be formed diagonally opposite to blue image pixel. The red image pixel may be formed adjacent to the broadband image pixel and blue image pixel and diagonally opposite to the infrared image pixel. Unit cell 46 may be repeated throughout array 20 in a repeating pattern. In this way, broadband image pixels, infrared image pixels, blue image pixels, and red image pixels 22 may be formed in every second column of pixel array 20.

Pixel array 20 having unit cell 46 may perform a weighted subtraction to generate green image signals. Performing the weighted subtraction to generate the green image signals may amplify noise generated by arrays having unit cell 46 relative to arrays having unit cell 40 of FIG. 4. Pixel array 20 having unit cells 46 may have improved chromatic resolving power and aliasing relative to pixel arrays having unit cell 40 of FIG. 4 because the number density of infrared, red, and blue image pixels in unit cell 46 is greater than the number density of infrared, red, and blue image pixels in unit cell 40. Arrays 20 having unit cell 46 may have reduced luminance resolving power and signal-to-noise-ratio relative to arrays having unit cells 40, 42, or 44 (e.g., because arrays having unit cell 46 include broadband image pixels 22 in every other column and row whereas arrays having unit cells 40, 42, and 44 have broadband image pixels 22 in every column and row). For example, arrays 20 having unit cell 46 may have approximately 1 dB of signal-to-noise ratio improvement over pixel arrays without broadband image pixels, whereas arrays 20 having unit cells 40, 42, or 44 may have approximately 3 dB of signal-to-noise ratio improvement over Bayer filter pixel arrays. However, pixel arrays 20 having unit cell 46 may require fewer image processing resources relative to pixel arrays having unit cells 40, 42, and 44, because unit cell 46 has fewer total pixels than unit cells 40, 42, and 44 (e.g., image sensor 16 having unit cells 46 may require less time and power for image processing than image sensors having unit cells 40, 42, or 44).

The example of FIG. 7 is merely illustrative. If desired, image pixels 22 within unit cell 46 may be arranged in any order. For example, the positions of the red, blue, broadband, and infrared pixels 22 in unit cell 46 may be permuted (e.g., the location of the red image pixel in unit cell 46 may be swapped with the location of the blue image pixel, etc.). If desired, the red, green, and/or blue pixels 22 of FIGS. 3-7 may be replaced by image pixels of any desired color (e.g., yellow, magenta, cyan, or any other desired color that has a narrower spectral response than broadband image pixels 22).

Broadband image pixels 22 in array 20 can help increase the signal-to-noise ratio (SNR) of image signals captured by image pixels 22 by gathering additional light in comparison with image pixels having a narrower color filter (e.g., a filter that transmits light over a subset of the visible light spectrum), such as green image pixels. Broadband image pixels 22 may particularly improve SNR in low light conditions in which the SNR can sometimes limit the image quality of images. Image signals gathered from image pixel array 20 having broadband image pixels (e.g., as shown in FIGS. 3-7) may be converted to red, green, and blue image signals to be compatible with circuitry and software that is used to drive most image displays (e.g., display screens, monitors, etc.). This conversion generally involves the modification of captured image signals using a color correction matrix (CCM). If care is not taken, color correction operations can undesirably amplify noise.

In one suitable arrangement, noise generated by the CCM may be reduced by implementing strong de-noising (e.g., chroma de-noising) prior to applying the CCM to gathered image signals. Chroma de-noising may be performed by processing circuitry 18 (FIG. 1) by applying a chroma filter to image signals gathered by image pixels 22. The chroma filter may serve to increase noise correlation between image signals from different colored image pixels (e.g., red, white, and blue image signals). Increasing noise correlation between image signals from different colored image pixels may reduce noise amplification by the CCM, leading to improved final image quality. In another arrangement, noise amplified by the CCM may be compensated for by applying a so-called "point filter" to the captured image signals. The point filter may use high fidelity broadband image signals to enhance the quality of red, green, and blue image signals produced using the CCM. If desired, image sensor 16 may implement both chroma de-noising and the point filter to reduce noise amplification by the CCM to yield improved luminance performance in the final image.

Figure 8:
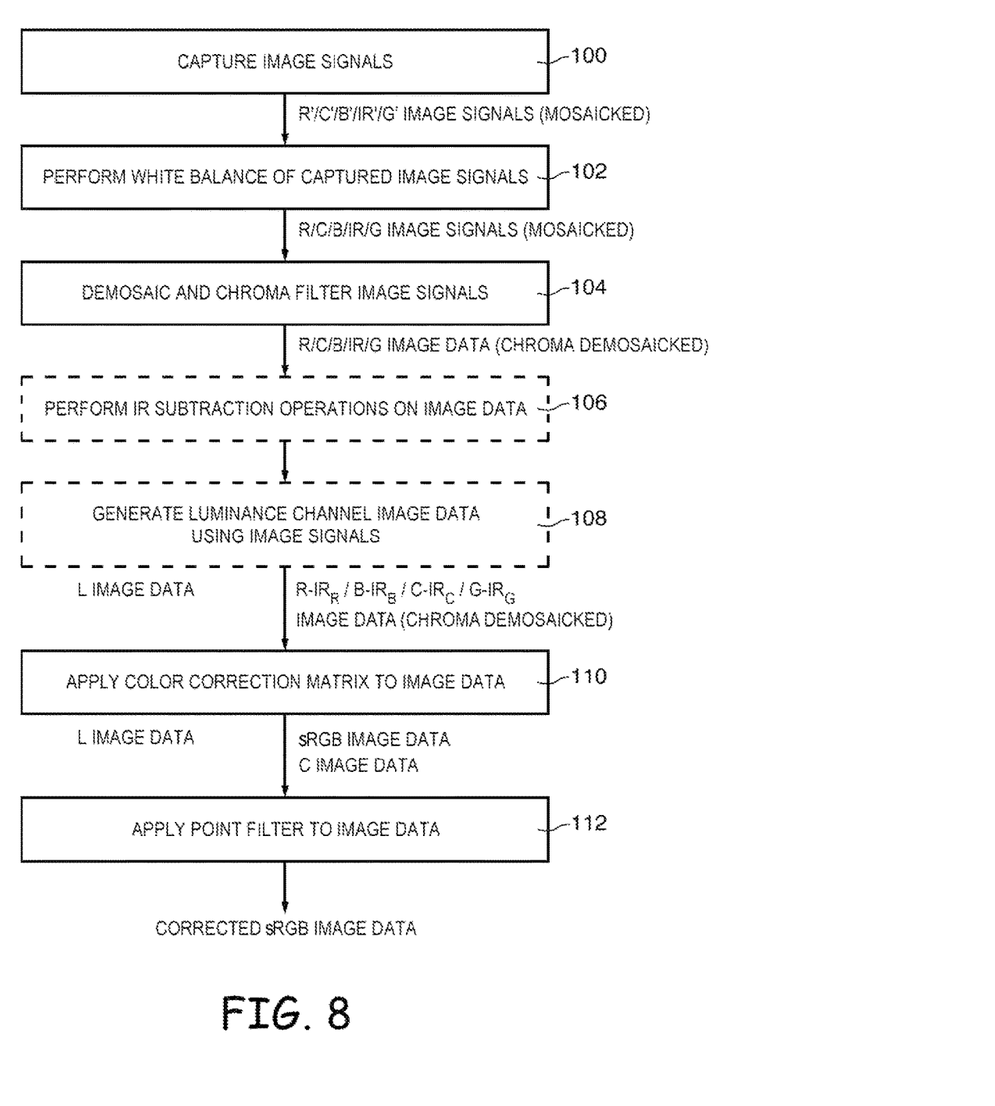
FIG. 8 is a flow chart of illustrative steps that may be performed by processing circuitry in an imaging system to process image signals received from a filtered pixel array having broadband filter pixels and infrared-sensitive pixels in accordance with an embodiment of the present invention.

FIG. 8 shows a flow chart of illustrative steps that may be performed by processing circuitry such as processing circuitry 18 of FIG. 1 to process image signals gathered by a filtered pixel array such as pixel array 20 (e.g., a pixel array having broadband and infrared image pixels). The steps of FIG. 8 may, for example, be performed by processing circuitry 18 to generate visible light and/or infrared light images while reducing noise in image signals captured using unit cells having broadband image pixels and infrared image pixels such as those shown in FIGS. 3-7.

At step 100, image sensor 16 may capture image signals from a scene. The image signals captured by image sensor 16 may include clear (broadband) image signals generated in response to light gathered with broadband image pixels 22 and may include infrared image signals gathered in response to infrared light gathered by infrared image pixels 22. If desired, the image signals may also include one or more of red image signals, blue image signals, or green image signals (e.g., depending on which pixel unit cell is used). For example, if array 20 is formed with unit cells 40 of FIG. 4 or unit cells 42 of FIG. 5, then the image signals may include red, clear, infrared, and blue image signals, and if array 20 is formed with unit cells 44 of FIG. 6 or unit cells 46 of FIG. 7, then the image signals may additionally include green image signals (e.g., green image signals generated in response to light gathered with green image pixels 22).

In the example of FIG. 8, image sensor 16 may capture red (R'), broadband (C'), blue (B'), infrared (IR'), and optionally green (G') image signals. The red image signals may have a first spectral response value (a signal power level as a function of the wavelength of light received by red image sensor pixels), the blue image signals may have a second spectral response value, and the broadband image signals may have a fourth spectral response value that is, for example, greater than a sum of the first and second spectral response values (e.g., the broadband image signals may have a broadband sensitivity for an equal energy radiator over the visible light spectrum with standard CIE illuminant E). The image signals may have image values corresponding to light captured by each image pixel 22 (e.g., red image signals may include a red image value, blue image signals may include a blue image value, etc.). The captured image signals may be conveyed to processing circuitry 18 for image processing.

At step 102, processing circuitry 18 may perform white balance operations on the captured image signals. In the example of FIG. 6, processing circuitry 18 may produce a white-balanced red image signal (R), white-balanced broadband image signal (C), white-balanced blue image signal (B), white-balanced infrared image signal (IR), and optionally a white-balanced green image signal (G) using the captured image signals.

At step 104, processing circuitry 18 may demosaic and apply a chroma filter to the white-balanced image signals to extract demosaicked red, broadband, infrared, blue, and optionally green image data from the white-balanced image signals. The chroma filter may be applied to chroma de-noise the white-balanced image signals. Processing circuitry 18 may, for example, demosaic the image signals and apply the chroma filter simultaneously, sequentially, or in an interspersed manner. This process of applying a chroma filter and demosaicking the image signals may sometimes be referred to herein as "chroma demosaicking" The chroma filter may increase noise correlation between image signals of each color (e.g., noise fluctuations in the red, broadband, infrared, and blue channels may increase or decrease together in a correlated manner). For example, processing circuitry 18 may increase the correlated noise between the red, broadband, blue, infrared, and green image signals to as much as 70% or more of all noise associated with the red, broadband, blue, infrared, and green image signals. By increasing noise correlation, processing circuitry 18 may reduce the amount of noise amplification generated when a CCM is applied to the image signals. Chroma demosaicking the image signals may allow missing color image signals (e.g., image signals of colors not generated by the image pixels) to be determined from available color image signals (e.g., by demosaicking missing pixel values for each of the pixels in array 20).

Image pixels 22 that are sensitive to light in the visible light spectrum (e.g., red pixels, green pixels, blue pixels, broadband pixels, etc.) may sometimes be referred to herein as visible light sensitive pixels 22 or visible light pixels 22. In scenarios where an infrared notch filter is formed across each of the image pixels 22 in array 20, a portion of the image signals captured by the visible light sensitive image pixels 22 (e.g., the red, broadband, blue, and green image pixels 22 in array 20) may be generated in response to infrared light. Infrared light captured by visible light-sensitive image pixels 22 can cause visible light-sensitive image pixels 22 to generate erroneous pixel values.

At optional step 106, processing circuitry 18 may perform infrared image signal contamination subtraction operations on the chroma demosaicked image data. Processing circuitry 18 may, for example, perform optional step 106 in scenarios where an array-wide infrared notch filter is formed for all image pixels on array 20. Processing circuitry 18 may determine an estimated value of the portion of the image signal of each color that was generated in response to infrared light. Processing circuitry 18 may subtract the estimated value from the image signals to remove the infrared light contribution to the image signals. In the example of FIG. 8, processing circuitry 18 may generate infrared-subtracted image data R-IR$_R$, B-IR$_B$, C-IR$_C$, and G-IR$_G$ by subtracting the estimated value from the red, blue, broadband, and green image signals, respectively.

If desired, processing circuitry 18 may estimate the infrared light contribution (portion) of the visible light image signals using an infrared subtraction matrix (e.g., processing circuitry may determine estimation values of infrared portions of the visible light image signals using an infrared subtraction matrix). The estimated values may be subtracted from the pixel values generated by each image pixel 22 of the corresponding color. In the examples of FIGS. 6 and 7 in which no green image pixels 22 are formed on pixel array 20, undesirable infrared portions of the red, broadband, and blue image signals may be estimated using a three-row by four-column infrared subtraction matrix. Estimated infrared light contributions for the red, blue, and broadband image signals may, for example, be determined using the following equation:

$$\begin{bmatrix} IR_R \\ IR_C \\ IR_B \end{bmatrix} = \begin{bmatrix} k_{RR} & k_{RC} & k_{RB} & k_{RI} \\ k_{CR} & k_{CC} & k_{CB} & k_{CI} \\ k_{BR} & k_{BC} & k_{BB} & k_{BI} \end{bmatrix} \begin{bmatrix} R \\ C \\ B \\ IR \end{bmatrix} \quad (1)$$

where R, C, B, and IR are respective red, broadband, blue, and infrared pixel values, where IR$_R$ is the estimated value of the infrared portion of the red pixel values (e.g., IR$_R$ is an estimate of the portion of the red pixel values that was generated by red image pixels in response to infrared light), where $IR_C$ is an estimated value of the infrared portion of the broadband pixel values, where $IR_B$ is the estimated value of the infrared portion of the blue pixel values, and where $k_{RR}, k_{RC}, \ldots, k_{BI}$ are constant values for estimating the infrared contamination of the red, broadband, and blue image signals.

The estimated values $IR_R$, $IR_C$, and $IR_B$ may be subtracted from the visible light pixel values to generate infrared-subtracted pixel values $R-IR_R$, $B-IR_B$, $C-IR_C$, and $G-IR_G$. In the examples of FIGS. 6 and 7 in which no green image pixels 22 are formed on pixel array 20, infrared-subtracted pixel values (infrared-subtracted image data) $R-IR_R$, $B-IR_B$, and $C-IR_C$ may, for example, be determined using the following equation:

$$\begin{bmatrix} R - IR_R \\ C - IR_C \\ B - IR_B \end{bmatrix} = \left( \begin{bmatrix} R \\ C \\ B \end{bmatrix} - \begin{bmatrix} IR_R \\ IR_C \\ IR_B \end{bmatrix} \right). \quad (2)$$

Infrared subtracted pixel values $R-IR_R$, $B-IR_B$, and $C-IR_C$ may be free from undesirable infrared light contamination. Subtracting infrared contributions from the visible light image signals can reduce the signal-to-noise ratio of the captured image data. If desired, processing circuitry 18 may mitigate noise clipping of the infrared subtracted image data by performing dark current subtraction after subtracting the estimated infrared values from the visible light image signals. If desired, processing circuitry 18 may perform additional noise filtering (e.g., chroma noise filtering) to mitigate noise amplification effects caused by performing infrared signal subtraction.

This example is merely illustrative. If desired, processing circuitry 18 may perform infrared subtraction operations on any visible light image signals (e.g., based on the color filter arrangement of array 20). In the examples of FIGS. 4 and 5 in which green image pixels 22 are formed on array 20, processing circuitry 18 may generate estimated infrared values $IR_R$, $IR_C$, $IR_B$, and $IR_G$ using a four-row by five-column infrared subtraction matrix. In scenarios where individual pixels 22 that are sensitive to visible light are coated with an infrared cutoff filter (e.g., instead of forming a filter coating across all of the pixels on array 20), visible light sensitive pixels 22 may generate image signals that are free from infrared light contributions (e.g., because the associated cutoff filters adequately block infrared light from being captured by pixels 22), and performing the infrared subtraction operations of step 106 may be omitted.

At optional step 108, processing circuitry 18 may generate luminance channel image data L (e.g., one or more luminance values sometimes referred to herein as original luminance values) by performing a linear combination (e.g., a weighted sum) of the infrared, red, broadband, blue, and green pixel values associated with each pixel 22 in array 20. By performing a weighted sum that includes infrared pixel values associated with each image pixel 22, processing circuitry 22 may reduce noise in a pixel value luminance channel relative to imaging systems that do not include infrared image pixels 22. Luminance channel image data L may be subsequently used for performing additional image processing operations such as applying a point filter on the image data.

At step 110, processing circuitry 18 may apply a color correction matrix (CCM) to the infrared-subtracted red image data, infrared-subtracted blue image data, infrared-subtracted clear (broadband) image data, and may optionally apply a CCM to the infrared-subtracted green image data (e.g., in scenarios where array 20 includes green pixels 22). In the examples of FIGS. 6 and 7 in which array 20 is formed without green image pixels, the CCM may extract green image data from the infrared-subtracted broadband image data to generate red, green, and blue image data. For example, the CCM may convert the image data into standard red, standard green, and standard blue image data (sometimes referred to collectively as linear sRGB image data or simply sRGB image data). In the examples of FIGS. 4 and 5 in which array 20 includes green image pixels 22, the CCM may convert the infrared-subtracted red, blue, green, and broadband image data into standard red, standard green, and standard blue image data. If desired, gamma correction processes may be performed on the linear sRGB image data. After gamma correction, the sRGB image data may be used for display using an image display device. In some cases, it may be desirable to provide additional noise reduction (e.g., by applying a point filter to the sRGB image data) to further mitigate the noise amplification generated by applying the CCM to the red, broadband, blue, and green image data. Processing circuitry 18 may preserve the broadband image data and the luminance channel image data (e.g., luminance channel image data L as generated at step 108) for further processing of the sRGB image data during step 112.

At step 112, processing circuitry 18 may apply a point filter to the image data (e.g., to the sRGB image data produced after applying the CCM to the infrared-subtracted image data). The point filter may operate on the sRGB image data to generate corrected sRGB data. The point filter may serve to further reduce noise amplification caused by applying the CCM to the infrared-subtracted image data. When displayed using a display system, the corrected sRGB data thereby provide improved image quality (e.g., better luminance performance) when compared to the sRGB data prior to applying the point filter.

Figure 9:
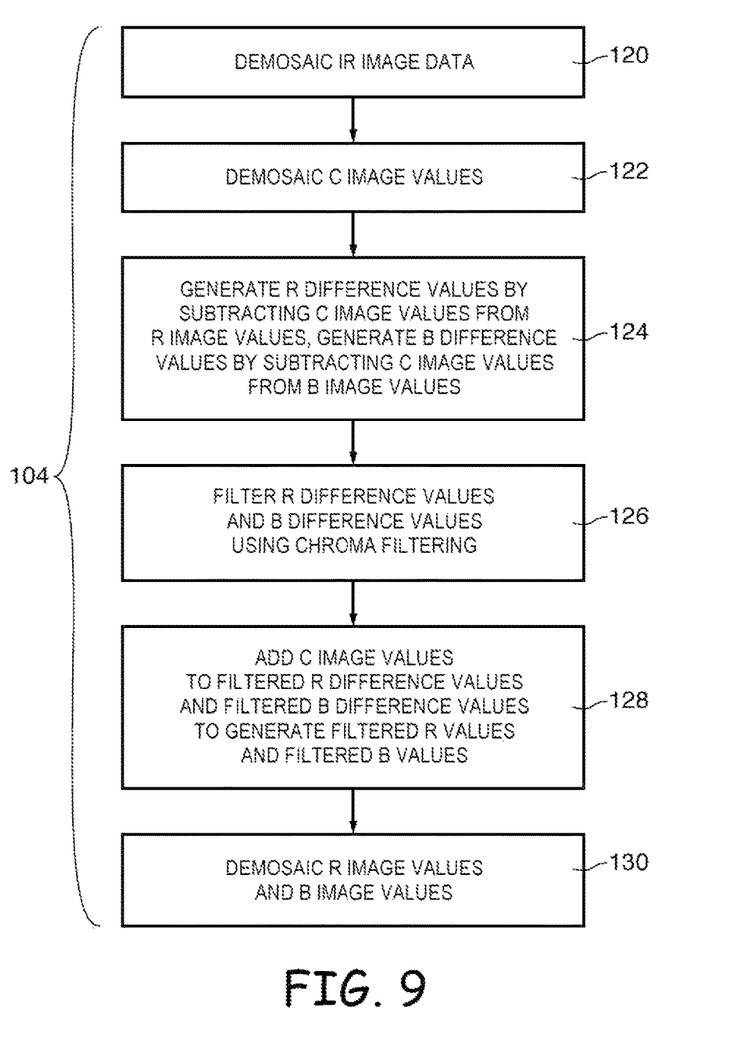
FIG. 9 is a flow chart of illustrative steps that may be performed by processing circuitry in an imaging system to demosaic and filter image signals received from a filtered pixel array having broadband filter pixels and infrared-sensitive image pixels in accordance with an embodiment of the present invention.

FIG. 9 shows a flow chart of illustrative steps that may be performed by processing circuitry 18 to demosaic and filter image signals received from image pixel array 20. The steps of FIG. 9 may, for example, be performed by processing circuitry 18 to perform chroma demosaicking on red, broadband, and blue image signals gathered by image pixels 22 to generate sufficient noise correlation in red, broadband, and blue image data. The steps of FIG. 9 may, for example, be performed as part of step 104 of FIG. 8.

At step 120, processing circuitry 18 may demosaic the infrared image signal to produce infrared image data (e.g., an infrared image (pixel) value for each image pixel). For example, processing circuitry 18 may interpolate infrared pixel values for each non-infrared image pixel 22 in array 20 using the infrared pixel values captured by infrared image pixels 22. In this way, processing circuitry 18 may fill in missing infrared pixel values for each visible light-sensitive pixel in array 20. The demosaicked infrared image data may be used to perform infrared subtraction operations on the red, blue, broadband, and green image data (e.g., while processing step 106 of FIG. 8). In another suitable arrangement, infrared image values may be produced for a combination of available image pixels 22. If desired, processing circuitry 18 may pass the demosaicked infrared image data to other processing circuitry for additional image processing (e.g., processing circuitry 18 may generate an infrared image using the demosaicked infrared image data).

In scenarios where an infrared filter coating is provided for all image pixels 22 across array 20 (e.g., when all image pixels in array 20 are sensitive to infrared light), processing circuitry 18 may perform interpolation on infrared image signals based on cross-channel noise correlations. For example, in low light-level situations in which most of the image light from a scene is infrared (e.g., if there is active infrared illumination of a scene by an infrared emitter on device 10 while at low ambient light levels), each of the different color image signals (e.g., each of the image signal color channels) may be highly correlated. Processing circuitry 18 may characterize the amount of correlation between each image signal channel by computing scene statistics (e.g., average pixel ratios). If desired, processing circuitry 18 may use identified correlations between the image signal channels to determine an interpolation direction for infrared image pixels 22 and/or to determine infrared pixel values (e.g., by computing Laplacian gradients between the image signal channels or by assuming constant local hue and using color ratios from nearby pixel locations on array 20).

At step 122, processing circuitry 18 may demosaic the broadband image signal to produce broadband image data (e.g., a broadband image value for each image pixel). In another suitable arrangement, broadband image values may be produced for a combination of available image pixels 22. The broadband image values may be used to compute difference values using the red and blue image signals to increase noise correlation between the red, broadband, and blue image signals.

At step 124, processing circuitry 18 may generate red difference values by subtracting the broadband image values from the red image values for each pixel. Processing circuitry 18 may generate blue difference values by subtracting the broadband image values from the blue image values. The red difference values may, for example, be computed for each red image pixel and the blue difference values may be computed for each blue image pixel in array 20.

At step 126, processing circuitry 18 may filter the red difference values and the blue difference values using a chroma filter. The chroma filter may be applied to the red and blue difference values by, for example, performing a weighted average of difference values computed over a kernel of image pixels 22 (e.g., a weighted average of a group of difference values that were computed by performing step 122). The kernel of image pixels may be defined as a subset of the image pixels in image pixel array 20 over which the chroma filtering is being performed (e.g., the kernel may include some or all of the image pixels in image pixel array 20). For example, when a five-pixel by five-pixel kernel is used, a weighted average of difference values is calculated for a five-pixel by five-pixel subset of image pixels 22 in image pixel array 20 when performing chroma filtering (e.g., a weighted sum of difference values may be computed for a given image pixel 22 using difference values at 25 surrounding image pixels in image pixel array 20). In general, a kernel of any desired size may be used.

At step 128, the broadband image values may be added to the chroma filtered red difference values and the chroma filtered blue difference values to generate chroma filtered red image values and chroma filtered blue image values, respectively.

At step 130, processing circuitry 18 may demosaic the chroma filtered red image values and the chroma filtered blue image values to produce chroma-demosaicked red image data and chroma-demosaicked blue image data (e.g., red and blue image data that has been chroma demosaicked) with increased correlated noise. The demosaicked broadband image data and the chroma demosaicked red and blue image data may then be operated on to generate infrared-subtracted broadband, red, and blue image data as described above in connection with step 106 of FIG. 8.

The example of FIG. 9 is merely illustrative. If desired, processing circuitry 18 may demosaic the chroma filtered red and blue image values prior to generating the red and blue difference values (e.g., processing circuitry 18 may perform step 118 prior to step 112). In scenarios where array 20 includes green image pixels (e.g., as shown in FIGS. 4 and 5), processing circuitry 18 may generate chroma demosaicked green image data.

If chroma filtering of the difference values is performed over a sufficiently large kernel of image pixels 22, minimal noise from the red and blue image signals may remain in the red and blue difference values after chroma filtering (e.g., after performing step 114). For example, if the kernel has a size of 15-pixels by 15-pixels or greater, chroma filtering may reduce noise in the red and blue chroma filtered difference values to negligible levels. If desired, the kernel of image pixels 22 may include image pixels located in multiple image pixel arrays 20, image pixels located in multiple image sensors 16, and/or image pixels used during multiple time frames (e.g., to allow for temporal denoising). When the broadband image values are added to the chroma filtered difference values, noise in the broadband image values may dominate over noise in the difference values. In this way, noise in the red and blue image data produced at step 126 may be substantially equal to noise in the broadband image data. Noise in the red and blue image data may thereby be highly correlated, resulting in reduced noise amplification by the CCM.

The CCM may operate on the infrared-subtracted red, broadband, and blue image data to produce linear sRGB data at step 110 (FIG. 6). In examples where array 20 does not include green image pixels 22, the CCM may extract information from the broadband image data to generate the standard green data. The broadband image data (e.g., the demosaicked broadband image data produced at step 120) may be preserved after operating on the image data with the CCM. The sRGB image data may be represented in other three-dimensional spaces such as a luminance-chroma-hue (LCH) space. In an LCH space, the luminance channel may be related to the brightness of an image captured by image sensor 16, the chroma channel may be related to the color saturation of an image, and the hue channel may be related to the specific color of the image (e.g., red, purple, yellow, green, etc.). The perception of noise and sharpness in a displayed image may be affected by noise and signal variations in the luminance channel. The SNR in the image data may be improved by transforming the sRGB data to LHC data, replacing a luminance value in the luminance channel with a broadband image value (which correlates well with overall image brightness due to the broad spectrum of the white image signal), and transforming the LHC data back to sRGB data. In this way, noise amplification caused by the CCM may be suppressed in the luminance channel, where noise is particularly noticeable to a viewer when viewing a displayed image.

As described above in connection with step 112 of FIG. 8, a point filter may be applied to the linear sRGB data to produce corrected sRGB data using the broadband image data. The point filter may operate on a single image pixel 22 without information from adjacent image pixels 22, whereas chroma demosaicking may require image signals (e.g., difference values) from multiple image pixels (e.g., a kernel of image pixels) when being applied to image signals at a single image pixel 22. For example, the point filter may operate on a standard red value, standard green value, and standard blue value for each image pixel. To perform point filter operations on the sRGB data, processing circuitry 18 may use the red image data, broadband image data, and blue image data (e.g., the image data prior to applying the CCM) to compute an original (raw) luminance signal. The original luminance signal may be a linear combination (e.g., a weighted sum) of the broadband image data, red image data, and blue image data. In scenarios where the luminance signal is generated using infrared image signals (e.g., in scenarios in which processing circuitry 18 performs optional step 108 of FIG. 8), the original luminance signal may be a linear combination of the broadband, red, blue, and infrared image data (e.g., the original luminance signal may include the luminance values determined while processing step 108 of FIG. 8).

Processing circuitry 18 may compute an implied luminance signal that is a linear combination of the standard red, standard green, and standard blue image data (e.g., after applying the CCM to the image data). If desired, weights in the linear combination used to compute the implied luminance signal may be substantially similar to the weights used to compute the original luminance signal. The weights may be adjusted to modify the "strength" of the point filter (e.g., the degree to which the point filter transforms or corrects the sRGB data).

Processing circuitry 18 may generate a scaling value (e.g., a scaling factor to be applied to color corrected image values) by, in a simplest case, dividing the original luminance signal by the implied luminance signal. If desired, the scaling factor may include a numerator and denominator. The numerator and/or the denominator of the scaling value may include a weighted sum of the original luminance signal and the implied luminance signal. The scaling value may include adjustable weighting parameters that can be varied to adjust the strength of the point filter (e.g., the weighting parameters may be continuously varied to adjust the strength of the point filter from zero to a full strength). To apply the point filter to the sRGB data (e.g., to the standard red, green, and blue image data), processing circuitry 18 may multiply the sRGB data by the scaling value to produce the corrected sRGB data. For example, processing circuitry 18 may multiply the standard red image data by the scaling value, the standard green image data by the scaling value, etc. If desired, the corrected sRGB data may have hue and chroma channels that are approximately preserved from before applying the point filter (e.g., upon conversion of the corrected sRGB data to LCH space). The corrected sRGB data may have improved noise and/or sharpness due to inherited fidelity of the broadband image signals.

Figure 10:
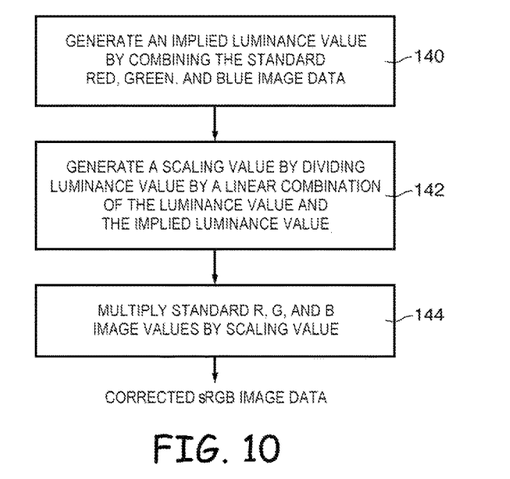
FIG. 10 is a flow chart of illustrative steps that may be performed by processing circuitry in an imaging system to apply a point filter to image signals received from a filtered pixel array having broadband filter image pixels and infrared-sensitive image pixels in accordance with an embodiment of the present invention.

FIG. 10 shows a flow chart of illustrative steps that may be performed by processing circuitry 18 to apply a point filter to sRGB data after applying the CCM to the red, broadband, and blue image data (as an example). Processing circuitry 18 may, for example, apply the point filter to sRGB data for each image pixel 22 in image pixel array 20. The steps of FIG. 10 may, for example, be performed as part of step 112 of FIG. 8.

At step 140, processing circuitry 18 may generate an implied luminance value (e.g., a luminance value in LCH space) for a given image pixel 22 by combining the standard red, green, blue image data (e.g., after applying a CCM). The implied luminance value may, for example, be computed as a linear combination of the standard red, green, and blue image data.

At step 142, processing circuitry 18 may generate a scaling value by dividing the original luminance value (e.g., the original luminance value as generated at step 108 of FIG. 8) by a linear combination of the implied luminance value and the original luminance value. The scaling value may include adjustable weighting parameters that can be varied to adjust the strength of the point filter (e.g., the weighting parameters may be varied continuously to adjust the strength of the point filter from zero to a full strength). If desired, processing circuitry 18 may select the weighting parameters based on the illuminant of the imaged scene. The scaling value may, for example, be an operator that operates on the sRGB data.

At step 144, processing circuitry 18 may multiply the sRGB data by the scaling value to produce corrected sRGB data (e.g., corrected standard red, green, and blue image data). For example, processing circuitry 18 may multiply the standard red image data by the scaling value, the standard green image data by the scaling value, etc. The corrected sRGB data may, if desired be provided to an image display. The corrected sRGB data may have improved noise and/or sharpness when compared with the sRGB data prior to applying the point filter.

The examples of FIGS. 1-10 are merely illustrative. If desired, any other suitable three-dimensional spaces may be used for performing the point filter operation. Any desired color filters may be used in conjunction with the broadband and infrared color filters shown in FIGS. 4-7 for obtaining color image signals. Unit cells 40 of FIG. 4 and 46 of FIG. 6 may, if desired, be arranged in a four-pixel by two-pixel pattern (e.g., so that each unit cell includes pixels from two columns and four rows of the array).

Figure 11:
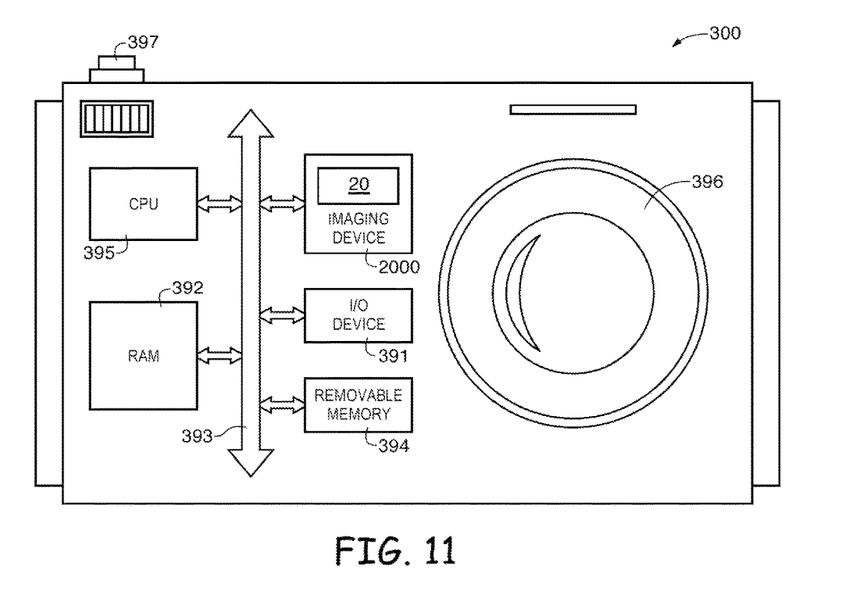
FIG. 11 is a block diagram of a processor system employing the embodiments of FIGS. 1-10 in accordance with an embodiment of the present invention.

FIG. 11 shows in simplified form a typical processor system 300, such as a digital camera, which includes an imaging device 2000 (e.g., an imaging device 2000 such as device 10 of FIGS. 1-10 employing broadband and infrared color filters and the techniques for operations described above). The processor system 300 is exemplary of a system having digital circuits that could include imaging device 2000. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 2000 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating image sensors having broadband image pixels and infrared-sensitive image pixels and image processing techniques (e.g., chroma demosaicking, applying a point filter, etc.) for reducing noise in the image signals.

An image sensor may have an array of image sensor pixels and processing circuitry. The array of image sensor pixels may include a first group of image sensor pixels that generate first image signals in response to light of a first color (e.g., red image sensor pixels that generate red image signals in response to red light), a second group of image sensor pixels that generate second image signals in response to light of a second color (e.g., blue image sensor pixels that generate blue image signals in response to blue light), a third group of image sensor pixels that generate third image signals in response to light of at least two of first color, the second color, and a third color that is different from the first and second colors (e.g., clear image sensor pixels may have a significant response to at least two of red light, green light, and blue light, and may generate the third image signals in response to light of at least the first and second colors, light of the second and third colors, light of the first, second, and third colors, light of the first and third colors, etc.). The array of image sensor pixels may include a group of infrared image sensor pixels that generate infrared image signals in response to infrared light. As an example, clear image pixels in the third group of image sensor pixels may generate clear image signals in response to red and green light, in response to red and blue light, in response to green and blue light, etc. The first image signals may, for example, have a first spectral response level (e.g., a signal power level as a function of the wavelength of light received by the first group of image sensor pixels), the second image signals may have a second spectral response level (e.g., a signal power level as a function of the wavelength of light received by the second group of image sensor pixels), and the third image signals may have a third spectral response level (e.g., a signal power level as a function of the wavelength of light received by the third group of image sensor pixels). The third image signals may have a spectral response level that is greater than the first and second spectral response levels. In other words, the third image signals may be captured in response to a broader range of light wavelengths than the first and second image signals.

If desired, the array of image sensor pixels may be arranged in a plurality of repeating unit cells of image sensor pixels. Each unit cell in the plurality of unit cells may include a first image sensor pixel from the first group of image sensor pixels (e.g., each unit cell may include a red image sensor pixel), a second image sensor pixel from the second group of image sensor pixels (e.g., each unit cell may include a blue image sensor pixel), a third image sensor pixel from the third group of image sensor pixels (e.g., each unit cell may include a clear image sensor pixel), and an infrared image sensor pixel from the group of infrared image sensor pixels. If desired, the array of image sensor pixels may include an additional group of image sensor pixels that generate image signals in response to a third color of light (e.g., green image sensor pixels). Each unit cell may, if desired, include one or more green image sensor pixels, additional infrared image sensor pixels, additional clear image sensor pixels, etc.

In one suitable arrangement, each unit cell in the array may include eight image sensor pixels arranged in two rows or two columns (e.g., as shown in FIGS. 4 and 6). In another suitable arrangement, each unit cell in the array may include sixteen image sensor pixels arranged in four rows or two columns (e.g., as shown in FIG. 5). Each row or column in the unit cell may include a respective pair of clear (broadband) image pixels (e.g., image sensor pixels from the third group of image sensor pixels). In another suitable arrangement, each unit cell in the array may include four image sensor pixels arranged in two rows or two columns (e.g., as shown in FIG. 7).

If desired, the processing circuitry may perform chroma demosaicking operations on the first, second, and third image signals that increase noise correlations associated with the first, second, and third image signals. The processing circuitry may perform infrared light contamination subtraction operations on the first, second, and third image signals be subtracting portions of the first, second, and third image signals that were generated in response to infrared light. If desired, the processing circuitry may generate an original luminance value by combining the first, second, third, and infrared image signals (e.g., by performing a weighted sum of the first, second, third, and infrared image signals). The processing circuitry may demosaic the infrared image signals using the first, second, and third image signals.

The processing circuitry may apply a color correction matrix to the first, second, and third image signals to generate standard red, standard green, and standard blue image data. If desired, the processing circuitry may perform point filter operations on the standard red, standard green, and standard blue image data. For example, the processing circuitry may generate an implied luminance value by combining the standard red, standard green, and standard blue image data, may generate a scaling value by dividing the original luminance value by a linear combination of the original and implied luminance values (e.g., in a simplest case, the processing circuitry may divide the original luminance value by the implied luminance value to generate the scaling value). The processing circuitry may generate corrected standard red, green, and blue image data by multiplying the standard red, standard green, and standard blue image data by the scaling value.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
   processing circuitry; and
   an array of physical image sensor pixels, wherein the array of physical image sensor pixels comprises:
   a first group of physical image sensor pixels configured to generate first image signals in response to light of a first color, wherein the first color is selected from a group consisting of: red, green, and blue;
   a second group of physical image sensor pixels configured to generate second image signals in response to light of a second color that is different from the first color, wherein the second color is selected from a group consisting of: red, green, and blue;
   a third group of physical image sensor pixels configured to generate third image signals in response to light of at least two colors, wherein the at least two colors are selected from a group consisting of: red, green, and blue; and
   a group of infrared physical image sensor pixels configured to generate infrared image signals in response to only infrared light, wherein the array of physical image sensor pixels comprises a plurality of repeating unit cells of physical image sensor pixels, wherein each unit cell in the plurality of unit cells comprises eight physical image sensor pixels arranged in first and second rows, the first row comprises a first pair of physical image sensor pixels from the third group and first and second infrared physical image sensor pixels from the group of infrared physical image sensor pixels, and the second row comprises a second pair of physical image sensor pixels from the third group, a physical image sensor pixel from the first group, and a physical image sensor pixel from the second group, and wherein the processing circuitry is configured to use the infrared image signals to correct the first, second, and third image signals.

2. The imaging system defined in claim 1, wherein each unit cell in the plurality of unit cells comprises four consecutive columns in the array, the first infrared physical image sensor pixel is formed in the second column, and the second infrared physical image sensor pixel is formed in the fourth column.

3. The imaging system defined in claim 1, wherein the first group of physical image sensor pixels comprises red physical image sensor pixels, and wherein the second group of physical image sensor pixels comprises blue physical image sensor pixels.

4. The imaging system defined in claim 1, wherein the processing circuitry is configured to perform filtering operations on the first, second, and third image signals that increase noise correlations associated with first, second, and third image signals.

5. The imaging system defined in claim 1, wherein the first group of physical image sensor pixels comprises red physical image sensor pixels, wherein the second group of physical image sensor pixels comprises blue physical image sensor pixels, and wherein the third group of physical image sensor pixels comprises clear physical image sensor pixels having clear color filter elements.

6. A method of generating images with an imaging system, wherein the imaging system comprises an array of physical image sensor pixels arranged in a plurality of repeating unit cells of physical image sensor pixels and processing circuitry, wherein each unit cell in the plurality of unit cells comprises first, second, third, and fourth physical image sensor pixels in a first row and fifth, sixth, seventh, and eighth physical image sensor pixels in a second row that is adjacent to the first row, the method comprising:

with the second physical image sensor pixel, capturing first image signals in response to light of a first color;

with the fifth physical image sensor pixel, capturing second image signals in response to light of a second color that is different from the first color;

with the seventh physical image sensor pixel, capturing third image signals in response to light of a third color that is different from the first and second colors;

with the first, third, sixth, and eighth physical image sensor pixels, capturing fourth image signals in response to light of at least two colors selected from the group of colors consisting of the first color, the second color, and the third color;

with the fourth physical image sensor pixel, capturing infrared image signals in response to only infrared light;

with the processing circuitry, performing chroma demosaicking operations on the captured first, second, third, and fourth image signals that increase noise correlations associated with the first, second, third, and fourth image signals such that noise fluctuations in the first, second, third, and fourth image signals increase and decrease together in a correlated manner to form first, second, third, and fourth sets of image data;

with the processing circuitry, generating fourth image signals of a fourth color using the infrared image signals;

with the processing circuitry, combining the first image signals, the second image signals, the third image signals, and the fourth image signals to form a first luminance value;

with the processing circuitry, computing a second luminance value based on the first image signals, the second image signals, the third image signals, and the fourth image signals; and with the processing circuitry, modifying the first image signals, the second image signals, the third image signals, and the fourth image signals using the first and second luminance values.

7. The method defined in claim 6, further comprising:
with the processing circuitry, performing infrared light contamination subtraction operations on the first, second, third, and fourth sets of image data.

8. The method defined in claim 6, further comprising:
with the processing circuitry, applying a color correction matrix to the first, second, third, and fourth sets of image data to generate standard red, standard green, and standard blue image data; and with the processing circuitry, performing point filter operations on the standard red, standard green, and standard blue image data.

9. The method defined in claim 8, further comprising:
with the processing circuitry, performing the point filter operations on the standard red, standard green, and standard blue image data based on the generated first and second luminance values.

10. A system, comprising:
a central processing unit;
memory;
input-output circuitry; and
an imaging device, wherein the imaging device comprises:
an array of image pixels arranged in rows and columns, wherein the array of image pixels comprises a first group of image pixels configured to generate first pixel values in response to light of a first color, a second group of image pixels configured to generate second pixel values in response to light of a second color, a group of infrared image pixels configured to generate infrared pixel values in response to only infrared light, and a group of broadband image pixels configured to generate broadband pixel values in response to light of at least two colors, wherein the group of broadband image pixels is arranged in a checkerboard pattern on the array of image pixels such that each row and each column in the array comprises at least one broadband image pixel from the group of broadband image pixels.

11. The system defined in claim 10, wherein the at least two colors are selected from a group consisting of: the first color, the second color, and a third color that is different from the first and second colors.

12. The imaging system defined in claim 2, wherein the physical image sensor pixel from the first group is formed in the first column and the image sensor pixel from the second group is formed in the third column.

13. The imaging system defined in claim 12, wherein the first pair of physical image sensor pixels from the third group comprises a first physical image sensor pixel formed in the first column and a second physical image sensor pixel formed in the third column and wherein the second pair of physical image sensor pixels from the third group comprises a third physical image sensor pixel formed in the second column and a fourth image sensor pixel formed in the fourth column.

14. The imaging system defined in claim 10, wherein the array of image pixels comprises a plurality of repeating four-pixel by four-pixel unit cells of image sensor pixels, and wherein each unit cell in the plurality of unit cells comprises eight broadband image pixels, two infrared image pixels, two image pixels from the first group, two image pixels from the second group, and two image pixels from a third group of image pixels configured to generate third pixel values in response to light of a third color that is different from the first and second colors.

15. The system defined in claim 14, wherein each unit cell includes consecutive first, second, third, and fourth rows and consecutive first, second, third, and fourth columns in the array, wherein a first of the two infrared image pixels is formed in the third row and second column, a second of the two infrared image pixels is formed in the first row and fourth column, a first of the two image pixels from the first group is formed in the second row and first column, a second of the two image pixels from the first group is formed in the fourth row and third column, a first of the two image pixels from the second group is formed in the second row and third column, a second of the two image pixels from the second group is formed in the fourth row and first column, a first of the two image pixels from the third group is formed in the first row and second column, and a second of the two image pixels from the third group is formed in the third row and fourth column.

16. The system defined in claim 15, wherein the first group of image pixels comprises red image sensor pixels, the second group of image pixels comprises blue image pixels, and the third group of image pixels comprises green image pixels.

17. The system defined in claim 10, wherein the first color is red, the second color is blue, and the at least two colors are selected from a group consisting of: red, green, and blue.

18. The system defined in claim 10, wherein the first group of image pixels, the second group of image pixels, the group of infrared image pixels, and the group of broadband image pixels are physical image pixels.

19. The system defined in claim 10, wherein the central processing unit is configured to use the infrared pixel values to correct the first, second, and broadband pixel values.

* * * * *